Patented Mar. 27, 1923.

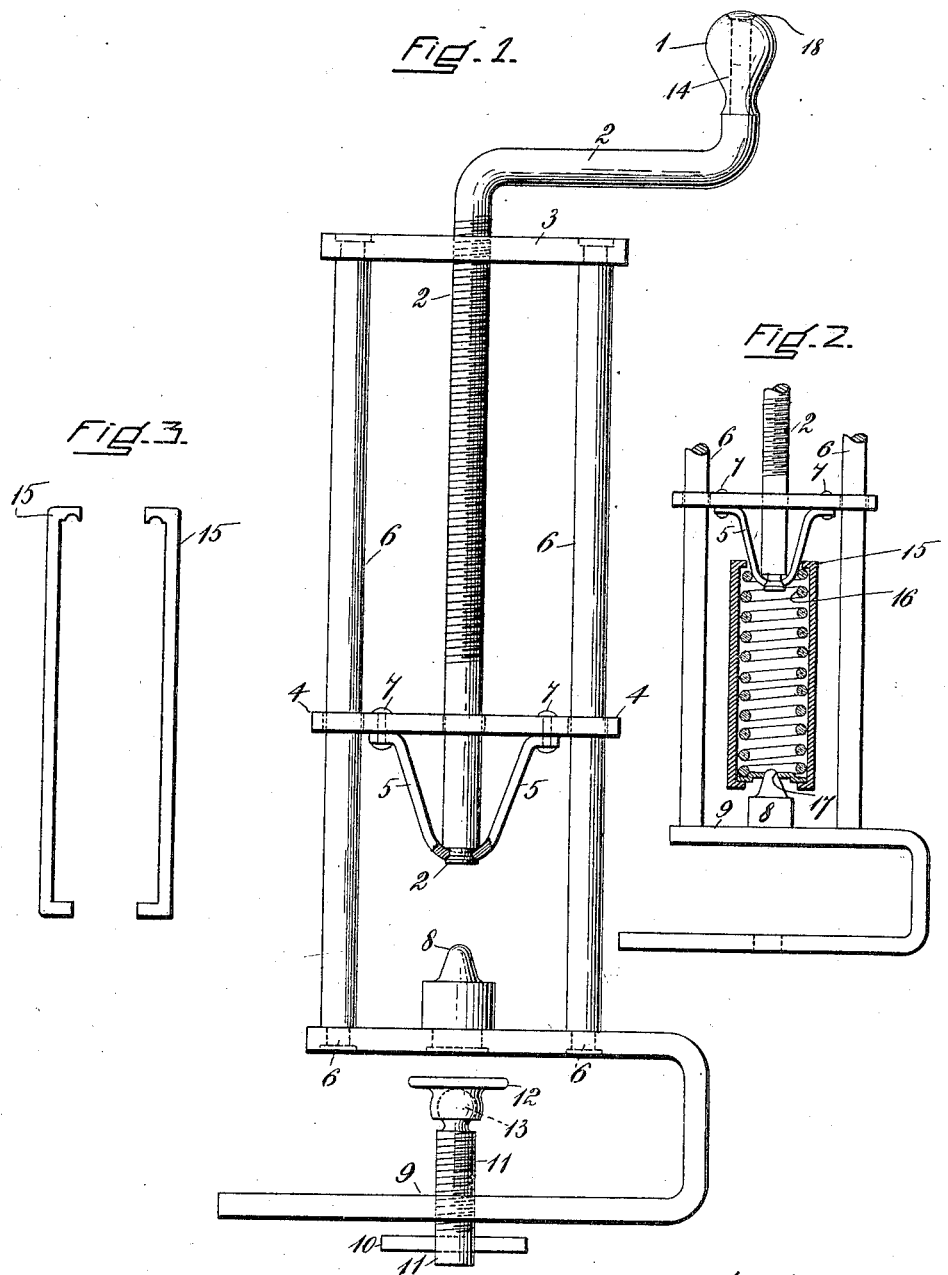

1,449,551

UNITED STATES PATENT OFFICE.

CEPHAS I. ROCK, OF BOSTON, MASSACHUSETTS.

DEVICE FOR COMPRESSING AND HOLDING COMPRESSED SPIRAL SPRINGS UNTIL RELEASED IN POSITION.

Application filed November 8, 1920. Serial No. 422,571.

*To all whom it may concern:*

Be it known that I, CEPHAS I. ROCK, a citizen of the United States, residing at Boston, in the county of Suffolk and State of Massachusetts, have invented a new and useful Device for Compressing and Holding Compressed Spiral Springs until Released in Position; said device is fully set forth in the following specifications, reference being had to the accompanying drawings.

The object of my invention is to rapidly compress together the coils of spiral springs and hold them compressed at any required length until placed and released in the position in which they are to operate.

This object and other advantages I hereinafter set forth in these specifications and accompanying drawings in which,—

Figure 1 is an elevation showing my invention with all working parts assembled, Figure 2 shows spring under compression with special clamps attached ready to be removed from compressing mechanism, Figure 3 is a perspective view of special clamps.

In different parts of the accompanying drawing,—1 is handle for part 2. Part 2 is crank threaded to fit part 3 and turned down to fit parts 1 and 5. Part 3 is top end of frame drilled and threaded to take part 2, also drilled and attached to 6—6. Part 4 is guide for part 5 drilled to fit on 2 and slide on 6. Part 5 is an automatic spring support fixed to parts 2 and 4. Part 6—6 are sides of frame attached to parts 3 and 9. Part 7—7 are rivets that rivet parts 4 and 5 together. Part 8 is the stationary automatic spring support fitted into part 9. Part 9 is bottom end of frame bent in clamp form for the purpose of attaching to work bench or other places convenient, it is drilled to attach to parts 6—6 and 8; drilled and threaded to take part 11. Part 10 is handle for part 11. Part 11 is a bolt threaded to fit part 9 drilled for handle 10 and turned to fit part 13. Part 12 is a flat or V shaped part attached to part 11 to hold device rigid when bolt 11 is tightened. Part 13 is a ball and socket joint attached to part 11. Part 14 is a spindle on part 2 to take part 1. Parts 15—15 are special clamps for holding spring in compressed condition. Part 16 is spiral spring in compressed condition. Part 17 is spiral spring seat. Part 18 is a washer holding part 1 to part 2.

To operate compressing mechanism turn crank 2 anticlockwise so to enlarge the distance between parts 5 and 8 when the required distance is reached insert the spring between parts 5 and 8 with open end against part 5 which is the sliding part of the device.

Place springseat or other end of spring on to part 8 or stationary part of device, then turn crank 2 clockwise which rapidly closes the distance between parts 5 and 8. When spring is fully compressed attach special clamps to opposite sides of spring which holds spring in compression when crank 2 is released by turning anticlockwise. Each of the parts 5 and 8 are so designed as to automatically adjust themselves to all sizes of coil springs for which the mechanism is designed.

The first advantage of my invention is that it is automatically adjustable to various sized spiral springs by the V shaped attachment in the sliding part of the mechanism.

The stationary spring support is also automatically adjusted to all sizes of spiral springs, with springseat or without, and that all moving parts of the mechanism are attached to one another and so combined that no loose or floating parts are required, the only action necessary being to place the spring between parts 5 and 8 and turn crank to compress or relieve spring, no parts need be assembled to make its compressing power complete.

The second advantage of my invention is the clamping device at bottom of mechanism that can attach it to work bench or other convenient places such as automobile running boards or fender in a rigid form allowing free use of one hand for attaching and holding clamps to spring when mechanism is being released.

The third advantage of my invention is the use of two clamps with offset ends and so designed in width, thickness and length to apply when spring is being compressed and also by the use of two clamps the spring is held in compressed condition when being released from mechanism. The clamps are so designed in width, thickness and length to take the least possible space which is an important factor on combustion engines where springs are close to cylinder walls, and center walls for valve cover plates, valve lifter guides and other obstacles to be contended with on combustion engines, or other purposes where clamps are required.

By the use of clamps in pairs the spring is held in a compressed and rigid form for inserting in position not obstructing the view or interfering with the attachments for holding spring in place, after the spring is inserted in position and attachments are in place to hold the spring clamps may be removed by prying off with hand lever or other suitable tool allowing the spring to expand to its normal working condition.

I claim as my invention:

1. In combination, a frame comprising cross members and lateral bars, one of said members being slidable on said bars and having a V-shaped projection, operating means for said slidable member comprising a rod in threaded engagement with said other member, a crank for said rod, a spring support adapted to cooperate with said V-shaped projection and a U-shaped clamp for supporting said frame.

2. In combination a frame comprising cross members and lateral bars, one of said members being slidable on said bars; means for operating said slidable member, a spring support adapted to cooperate with said slidable member in compressing a valve spring; and a U shaped clamp for supporting said frame.

CEPHAS I. ROCK.

Witnesses:
EDWARD CARR,
JOHN F. BARRY.